H. LOHMILLER, A. CLAUS & A. STAMLER.
DEVICE FOR RAISING VEHICLES.
APPLICATION FILED JUNE 17, 1914.
1,161,706.
Patented Nov. 23, 1915.
2 SHEETS—SHEET 1.
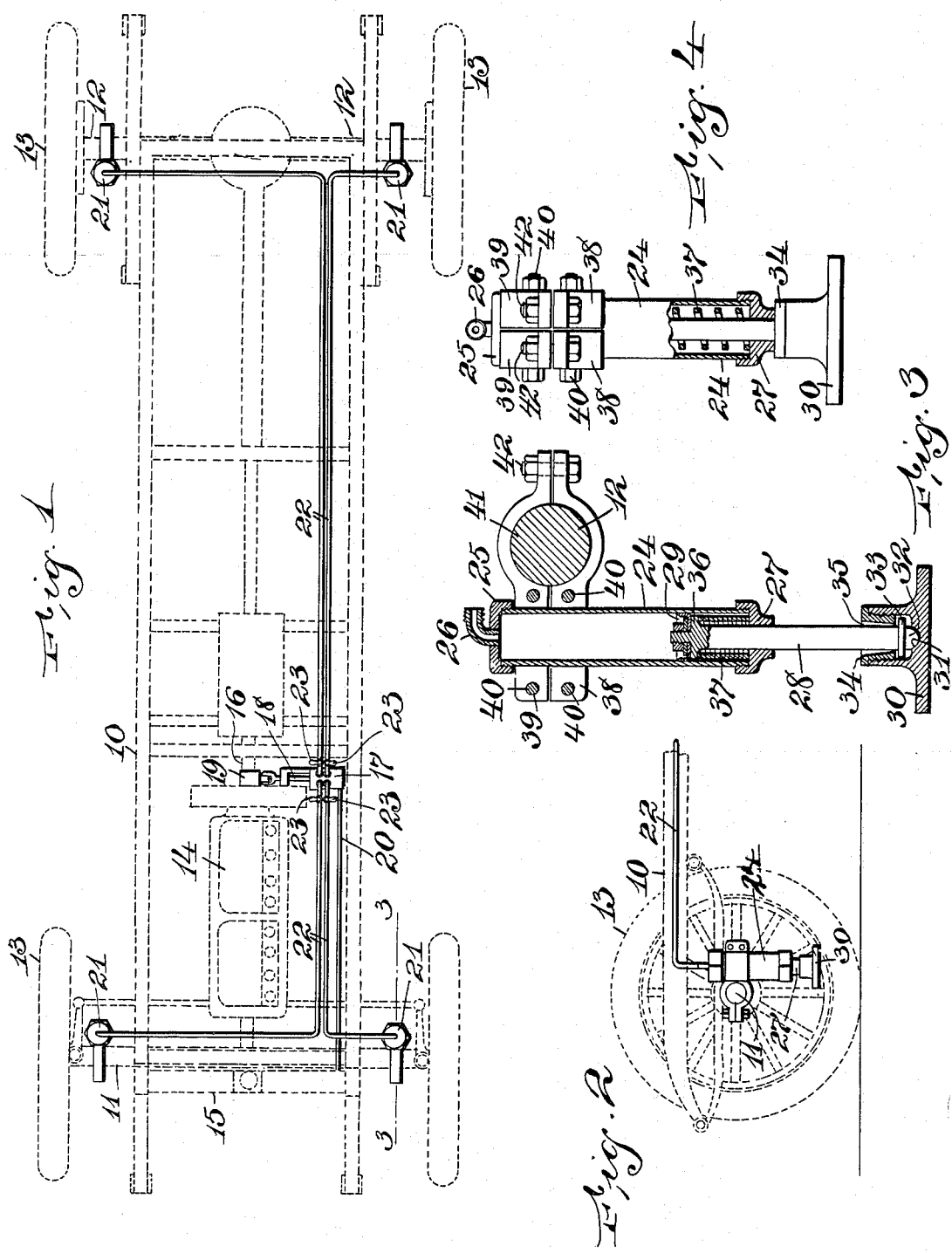
WITNESSES:
M. A. Johnson.
H. Drautvetter.
INVENTORS:
Harry Lohmiller, August Claus,
and Alexander Stamler,
BY
Dyke & Caufield
ATTORNEYS.

H. LOHMILLER, A. CLAUS & A. STAMLER.
DEVICE FOR RAISING VEHICLES.
APPLICATION FILED JUNE 17, 1914.
1,161,706.
Patented Nov. 23, 1915.
2 SHEETS—SHEET 2.
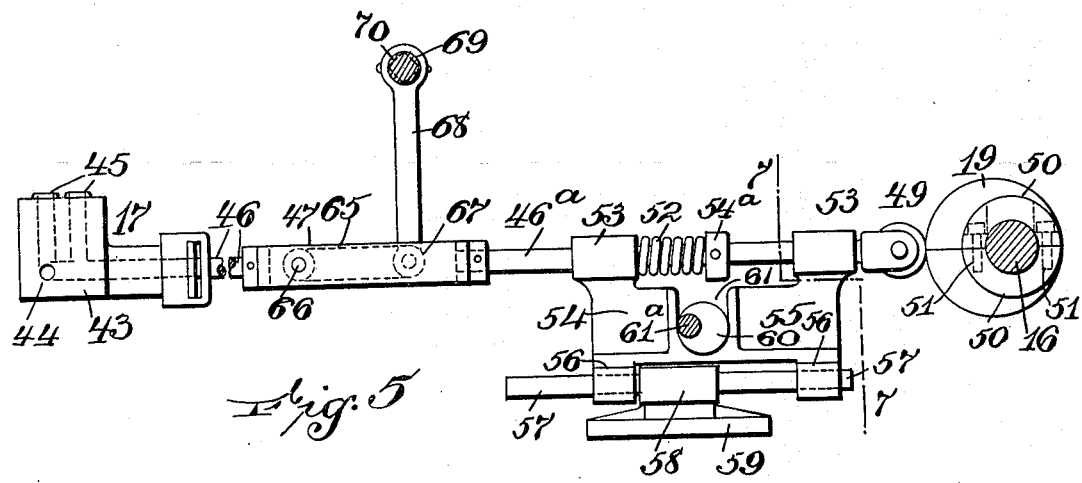
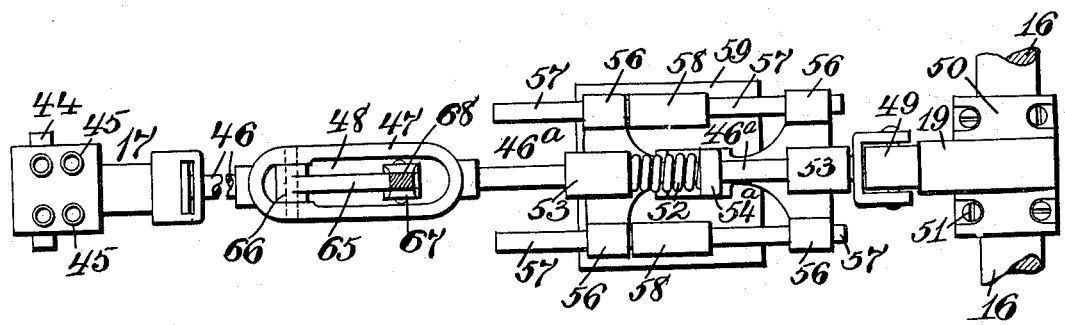
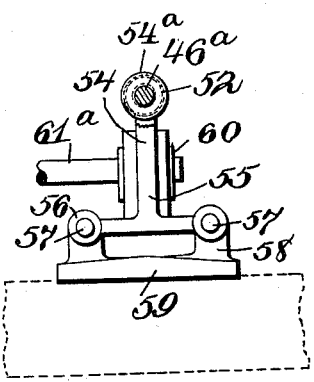
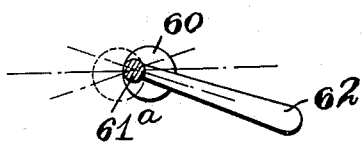
WITNESSES:
M. G. Johnson.
H. Brautvetter.
INVENTORS.
Harry Lohmiller, August Claus,
and Alexander Stamler,
BY
Dyke + Canfield.
ATTORNEYS.

UNITED STATES PATENT OFFICE.

HARRY LOHMILLER, AUGUST CLAUS, AND ALEXANDER STAMLER, OF RAHWAY, NEW JERSEY.

DEVICE FOR RAISING VEHICLES.

1,161,706.   Specification of Letters Patent.   Patented Nov. 23, 1915.

Application filed June 17, 1914. Serial No. 845,543.

*To all whom it may concern:*

Be it known that we, HARRY LOHMILLER, AUGUST CLAUS, and ALEXANDER STAMLER, citizens of the United States, and residents of Rahway, county of Union, and State of New Jersey, have invented certain new and useful Improvements in Devices for Raising Vehicles, of which the following is a specification.

This invention relates to an apparatus which is secured to a vehicle, the apparatus being designed to provide elevating means for the vehicle, this elevating means being in the form of jacks which can be attached singly or in greater numbers so that either a portion of the vehicle can be raised or the whole vehicle can be raised.

The invention is applicable to vehicles of different forms, but it is particularly adapted for automobiles.

The invention is further designed to provide an apparatus of the kind described in which the jacks can be utilized for raising the automobile or other vehicle, the weight of the vehicle thus being taken from the tires and the whole vehicle is raised at once so that time is saved and separate jacks will not have to be operated in succession.

A further object of the invention is the provision of a suitable hydraulic pump which is connected to the jacks which are preferably hydraulic jacks, the pump being adapted to be operated either manually or by means of a connection with the engine of the automobile, so that at the end of a ride it is only necessary to run the engine a short while when the jacks can be operated to raise the vehicle.

The invention is further designed to provide jacks which are subject to operation in one direction by hydraulic power, and in the reverse direction when the hydraulic power is relieved by the weight of the vehicle, and to a further extent by suitable mechanism which forces the jacks so that they are normally suspended above the ground, and which also forces the liquid in the hydraulic jacks from the jacks and thus clears them of said liquid.

The invention is further designed to provide a hydraulic pump which can be connected to the radiator or any other suitable reservoir mounted on the vehicle, the pump having valved connections with the jacks so that any or all of the jacks can be operated from the pump as desired.

A further object of the invention is to provide a connection for operating the pump from the engine, and means for disconnecting said means from the engine so that the pump is not operated, it being also possible to manipulate the connection so that the pump is operated from the engine, this connecting and disconnecting means being adapted to be manually operated and to prevent the running of the connection for operating the elevating mechanisms or jacks.

A further object of the invention is to provide a connection between the pump and the engine by means of which the pump is operated, said connection being also adapted to be operated by hand so that if the car is at a standstill and its engine is not running, the pump can be operated so that the jacks can be forced to a position to raise the vehicle from the ground.

The invention is illustrated in the accompanying drawings, in which the device is illustrated shown as attached to an automobile, this embodiment being preferred because it is adapted for use particularly on automobiles.

In said drawings Figure 1 shows a plan of an automobile frame and wheels and part of the operating mechanism, this being shown in dotted outline, and also illustrating the jacks, the pump and the connections between them, these being shown in full lines, but in this view no attempt is made to bring out any details. Fig. 2 is a section through the front part of Fig. 1 showing the front part of the frame and the front wheels and an elevating jack in position on the front axle. Fig. 3 is an enlarged section taken on line 3—3 in Fig. 1, this view illustrating one of the jacks. Fig. 4 is a side view of Fig. 3, the jack being shown in its inoperative or withdrawn position, the lower part of the cylinder of the jack being broken away. Fig. 5 is a side view of the pump, the crank-shaft and a connection between them, and Fig. 6 is a top view of the part of the device shown in Fig. 5. Fig. 7 is a section on line 7—7 in Fig. 5, and Fig. 8 is a detail view showing, in diagrammatic manner, the operation of a shifting and locking mechanism for moving the connection between the pump and the operating device on the engine shaft.

In the drawings we illustrate an automobile of conventional form with a frame 10 forming the chassis which is supported by an axle 11 at the front and an axle 12 at the back, these axles having the usual wheels 13. In the form shown we illustrate an engine 14 mounted in the fore part of the vehicle and a radiator 15. The engine has a drive-shaft or crank-shaft 16 which is suitably connected to wheels, generally the rear wheels, to propel the vehicle.

As far as described the apparatus is not new, and is simply illustrated to show a means for utilizing the invention.

Suitably mounted on the frame is a pump 17 which is operated by a connection 18 which is in turn moved by a device on the engine shaft, usually a cam 19, so that when the engine shaft rotates, the pump is operated. The feed pipe 20 is connected to the pump and also to a suitable reservoir or source of liquid supply. The radiator 15 is the most available and requires the installation of no new receptacle on the vehicle. Jacks 21 are secured at desired points on the vehicle, the particular point of attachment not being essential, but I have illustrated, in the drawings, the jacks as being secured to the axles 11 and 12. Pipes 22 are connected to the pump and also to the jacks to conduct liquid from the pump to the jacks and also in reverse direction, if desired, the pipes being preferably provided with cocks or faucets 23 to regulate the passage of liquid from the pump, and to act as vent cocks when the jacks are to be released from lifting or supporting a vehicle.

The above describes the general relation of the parts to each other and it will be clearly seen that any or all of the jacks can be operated from the pump by proper manipulation of the cocks 23.

We will now describe in detail the form of jack that we prefer to use. The jack consists of a cylinder 24 which is provided with a cap 25 at the top having a pipe connection 26 which forms means of attaching a pipe 22 to the cylinder of the jack. A cap 27 is arranged so that it closes the bottom of the cylinder 24. A stem 28 is provided with a piston 29 on its inner end, the piston being adapted to close the inside of the cylinder. On the lower end of the stem 28 is a foot 30 which has a rounded recess 31 to receive the rounded end 32 of the stem 28. A collar 33 is adapted to engage the bottom edge of a sleeve 34 which is screwed or otherwise secured in the top of the shoe and has a tapered opening 35. This structure permits the free movement of the shoe on the end of the stem 28 and permits it to rock to a considerable extent, this rocking being permitted by the rounded end of the stem fitting in the rounded recess 31 and also by the tapered opening 35. This rocking is desirable in order that the shoe if it is pressed against uneven ground, can adapt itself to such uneven surfaces it may rest on and not unduly strain the stem or the foot. Abutting on the cap 27 and on the bottom of the flange 36 on the top end of the stem 28 is a spring 37, the use of which will be described hereinafter. The cylinder can be secured to the vehicle in any desired manner, but we prefer to fasten it to the axle, this being accomplished by having clamps made up of four members, the lower members 38 being arranged side by side and directly underneath the upper members 39 which are also arranged side by side. The ends of the members 38 and 39 are curved to receive the cylinder 24, and suitable bolts 40 are used to clamp the members around the cylinder 24. The lower and upper members are recessed as at 41 and are clamped around the axle, which in the case shown is the axle 12, by bolts 42. This manner of attaching the jack permits its being attached and detached without adding any fixture to the car, and forms a steady and secure fastening for the jack and a fastening by means of which the jack is held against movement relative to the vehicle, and when the piston is forced down in the cylinder the jack is raised and it is tightly secured to the vehicle so that the vehicle is raised too.

The pump mechanism is illustrated in detail in Figs. 5 to 8 inclusive, and comprises a pump casing 43 which is of any suitable or desirable form of hydraulic pump having an inlet 44 for connection to the feed pipe 20 shown in Fig. 1, and the outlet 45 which serves as means for connecting the pipes 22 to the pump. A piston 46 reciprocates within the pump and operates in the usual manner to force liquid from the pump and to also draw liquid into the pump before it is forced from said pump in the usual manner of pumps of this kind.

The piston is operated from a piston rod 46$^a$, the piston rod 46$^a$ and the piston being connected by a yoke 47 having a space 48 within it for the installation of mechanism to be described hereinafter. The piston rod 46$^a$ has, on its outer end, an anti-friction device, preferably a roller 49 which bears on the cam 19 which is mounted on the shaft 16 of the engine, although it will be understood that the cam need not be mounted directly on the engine shaft, but can be indirectly driven from the engine. The cam 19 is made in two sections 50 which are held in their proper positions around the shaft 16 by screws 51. This permits the easy installation and removal of the cam from the shaft 16. The cam is preferably in the form of an eccentric, giving a steady and easy motion to the piston rod of the pump, the cam forcing the piston rod in one direction, the piston rod being forced in the other direction by a spring 52 which abuts against one of the bearings 53 and also abuts against a collar 54ª secured at a suitable point on the piston rod 46ª. It will thus be seen that as the cam is rotated the piston rod, and consequently the piston of the pump, is reciprocated and the pump is operated to force liquid from it.

Within the yoke 47 is a link 65, the link being pivoted at one end at 66 to the yoke 47, and being pivoted at its other end at 67 to an arm 68, the arm being mounted on a shaft 69. The shaft 69 has an end 70 which is adapted to receive a wrench or tool, or can be equipped with a crank, the drawing showing this end made square so that if an arm or crank is attached to the shaft 69 and is oscillated, the arm 68 is swung back and forth and the piston rod 46ª is operated, this device being used when the engine is not running and the cam is inoperative. The shaft 69 has its projecting end 70 placed at a point where it is convenient for operation from the outside of the vehicle. The spring 52 is pressed by one of the bearings 53 so as to hold the roller 49 up against or in close proximity to the cam 19, and if it is desired to not operate the device from the cam, the bearing 53 can be shifted by the following mechanism. The bearings 53 are mounted on a frame 54 which comprises a vertical rib 55 having transverse bearings 56. These bearings slide on parallel rods 57, these rods 57 being secured to lugs 58 mounted on a plate 59 which is attached to the vehicle frame or any solid element that will hold it in place. The rods 57 are long enough to permit a sliding of the frame 54 within a predetermined distance so that the frame can be shifted. This shifting is accomplished by means of an eccentric 60 which is placed in a recess 61 in the frame 54, the eccentric being mounted on a shaft 61ª. The shaft is so mounted that it locks the eccentric in place when it is thrown to one extreme position or the other, this being shown in detail in Fig. 8. The shaft 61ª has a handle 62, and when the handle is thrown to the position shown in Fig. 8 the eccentric is forced so that its center is below the center of the shaft 61ª so that any tendency to retreat on the part of the frame serves to press the eccentric 60 down tighter in its recess 61 and the frame is thereby held in place. When the handle is turned over, it swings the eccentric and further forces the frame 54 back and retreats from the spring 52 so that the spring does not operate to force the roller 49 against the cam 19. This swinging of the eccentric moves it to the dotted position shown in Fig. 8, in which position it is again below the center of the shaft 61ª and by being passed over the center it is locked in position when the frame is forced in a direction toward the cam. The handle 62 can be put in any convenient position so that it can be operated to shift the frame and therefore the connection between the pump and the engine to make the pump operative or inoperative. When the device is operated from the engine, the handle 62 is thrown to a position to put the roller 49 close up to or against the cam 19. As the engine of the automobile operates, the pump is thus operated through the mechanism above described and water is drawn from the radiator or other suitable reservoir and is pumped to the hydraulic jacks through the pipes 22, this being permitted by the opening of the cocks 23. The liquid flowing into the hydraulic jacks forces the stems 28 downward and the shoes 30 are forced against the ground, this all being done against the influence of the springs 37. As the pumping operation continues, the movement of the jacks continues and the vehicle is lifted from the ground and is in the position to relieve the tires from the weight of the vehicle and also to permit repairs which necessitate the inspection or operation of the parts from underneath the machine. If the device is to be held in position, the pump is stopped and the cocks 23 are turned to prevent any escape of liquid from the jacks.

If the machine is to be lowered, all that need be done is to turn the cocks 23 so that they vent the jacks and permit the escape of fluid and the weight of the machine will force the pistons up and force the liquid from the hydraulic jacks until the vehicle rests on the ground and its weight is removed from the jacks. The raising of the stems of the jacks, however, is continued by the spring 37 which raise the stems of the jacks and consequently the shoes 30 so that they are in the position shown in Figs. 2 and 4, that is, normally suspended above the ground. This action of the springs to raise the stems also forces the pistons upward and the pistons force the liquid, which is usually water, from the cylinders of the jacks, through the pipes 22 and the water escapes through the vents 23.

While we have shown the radiator as forming the reservoir or supply point for water for the pump, it is evident that we may install an additional reservoir for the water supply for the pump.

Having thus described our invention, we claim:

1. In an elevating device for vehicles, a series of vertically operating jacks secured to the vehicle, an engine on said vehicle, a pump, means for operating said pump from the engine of the vehicle, means to render said pump inoperative by the engine, and manually operable means for working the pump.

2. In an elevating device for vehicles, a hydraulic jack for raising said vehicle, a pump mounted on the vehicle, an engine on the vehicle, a piston rod for said pump, a frame in which said piston rod is guided, a spring abutting on the frame and on the piston rod for normally forcing the piston rod forward, a cam for operating the piston rod, and means for supporting the frame whereby said frame can be retracted and the piston rod withdrawn from engagement with the cam.

3. In an elevating device for vehicles, a hydraulic jack for raising said vehicle, a pump mounted on the vehicle, an engine on the vehicle, a piston rod for said pump, a frame in which said piston rod is guided, a spring abutting on the frame and on the piston rod for normally forcing the piston rod forward, a cam for operating the piston rod, means for supporting the frame whereby said frame can be retracted and the piston rod withdrawn from engagement with the cam, a yoke on said piston rod, a link having one end connected to the yoke, an arm pivotally supported at one end having its swinging end secured to the link, and means for oscillating said arm.

4. In an elevating device for vehicles, a hydraulic jack, an engine mounted on the vehicle, a hydraulic pump, a connection from the pump to the jack a piston rod working in the pump, a frame having bearings in which said piston rod reciprocates, a cam adapted to operate such piston rod, a spring bearing on the frame and on the piston rod, the frame having a recess therein, an eccentric mounted in said recess whereby said eccentric when it is turned moves said frame, and a handle for operating said eccentric.

In testimony that we claim the foregoing, we have hereunto set our names, this 12 day of June, 1914.

HARRY LOHMILLER.
AUGUST CLAUS.
ALEXANDER STAMLER.

Witnesses:
HELEN E. WHITE,
CHAS. J. STAMLER.